US006678638B2

(12) United States Patent
Takamura (10) Patent No.: US 6,678,638 B2
(45) Date of Patent: Jan. 13, 2004

(54) PROCESSOR HAVING EXECUTION RESULT PREDICTION FUNCTION FOR INSTRUCTION

(75) Inventor: Akihiro Takamura, Koganei (JP)

(73) Assignee: Hitachi, Ltd., Tokyo (JP)

( * ) Notice: Subject to any disclaimer, the term of this patent is extended or adjusted under 35 U.S.C. 154(b) by 160 days.

(21) Appl. No.: 10/050,777

(22) Filed: Jan. 18, 2002

(65) Prior Publication Data

US 2002/0138236 A1 Sep. 26, 2002

(30) Foreign Application Priority Data

Mar. 21, 2001 (JP) ......................................... 2001-079716

(51) Int. Cl.$^7$ ............................................... G06F 11/30
(52) U.S. Cl. ......................... 702/186; 712/239; 712/240
(58) Field of Search ......................... 702/186; 712/238, 712/239, 240, 237, 215

(56) References Cited

U.S. PATENT DOCUMENTS 6,427,206 B1 * 7/2002 Yeh et al. .................... 712/239

* cited by examiner

Primary Examiner—John Barlow
Assistant Examiner—Meagan S. Walling
(74) Attorney, Agent, or Firm—Antonelli, Terry, Stout & Kraus, LLP (57) ABSTRACT

A processor having an execution result prediction function for an instruction that performs a branch/value prediction by which a high percentage of correct predictions can be realized ought to be provided. Accordingly, in a branch/value prediction circuit having a set associative, a priority of an entry used for a prediction is increased only when an execution result is referred to for the prediction and the prediction is correct, and the execution result is registered in the entry of the lowest priority when the execution result for the instruction is newly registered in a history table. Thus, the entry of a low percentage of correct predictions becomes easy to erase and prediction accuracy can be increased by updating the priority only when the prediction is correct.

5 Claims, 7 Drawing Sheets

PROCESSOR HAVING EXECUTION RESULT PREDICTION FUNCTION FOR INSTRUCTION

FIELD OF THE INVENTION

The present invention relates to a management method of an execution result of an instruction executed in the past in a processor having a system for predicting the execution result of the instruction that is being executed currently from the execution result of the instruction executed in the past.

DESCRIPTION OF THE RELATED ART

In recent years, to enable high speed, processors have used pipelining that subdivides processing executed in a processor into the processing, such as instruction fetch, instruction decoding, read and execution of the operand, or write-back of an execution result, and executes it overlapping with instructions before and behind.

Figure 7:
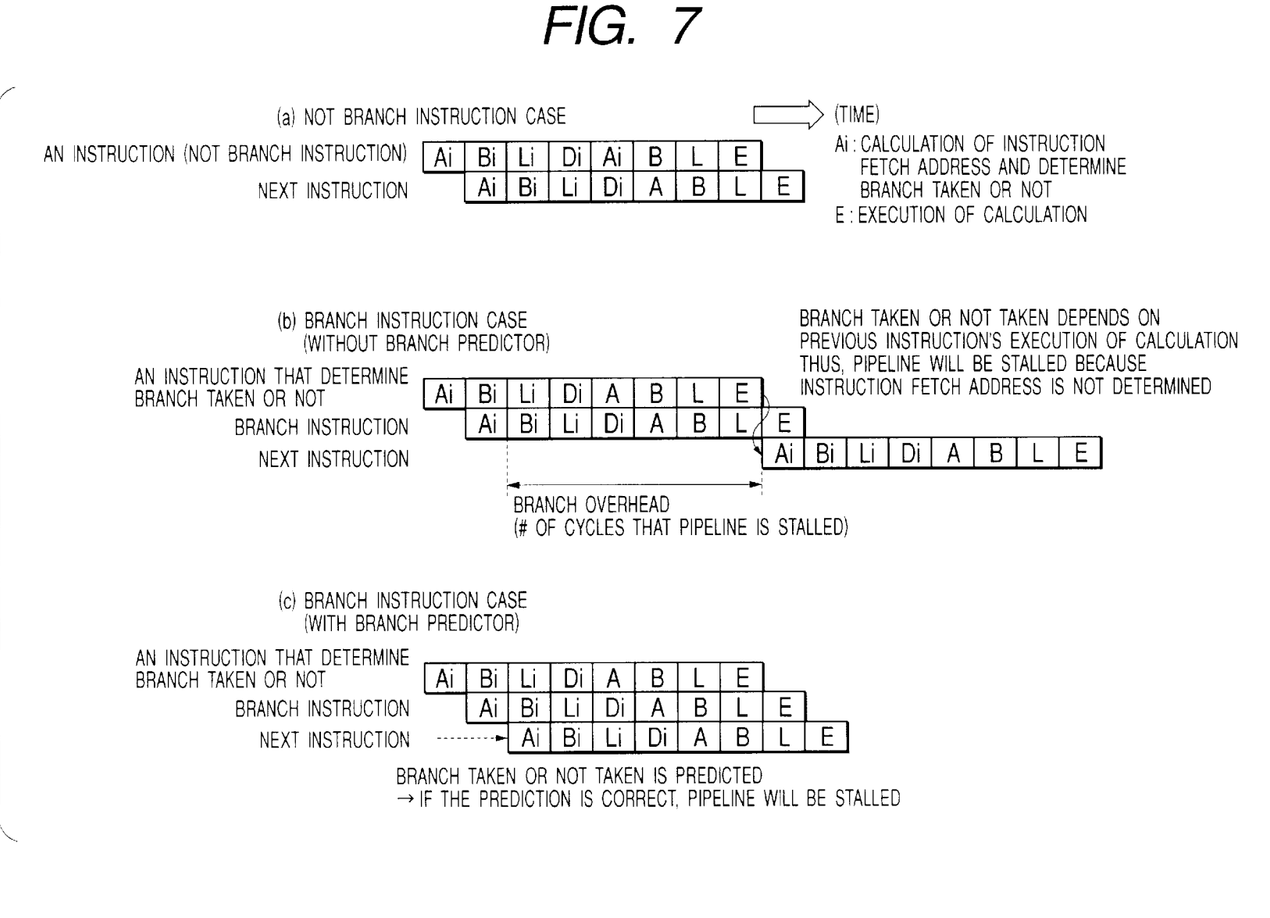
FIG. 7 is an example of enabling high speed using a branch prediction feature in a processor of pipelining.

A branch prediction feature improves the performance of the processor using the pipelining by preventing a pipeline from being stalled, which will occur when a conditional branch instruction is executed. As shown in FIG. 7, if the branch prediction feature is not provided, whether a branch is taken or not is not determined until the execution of the conditional branch instruction is completed. Accordingly, the instruction fetch for the succeeding instruction of the conditional branch instruction is disabled and the pipeline must be stalled. On the contrary, when the branch prediction feature is provided, the instruction fetch is enabled without waiting for the completion of the branch instruction by previously predicting the execution result (branch taken or not) of the conditional branch instruction. If a prediction is correct, the pipeline can be prevented from being stalled when the branch instruction is executed.

Similarly, a value prediction feature prevents the pipeline from being stopped by predicting the execution result of the instruction that is being executed currently and improves the performance of the processor. If the value prediction feature is not provided, when an instruction is executed, the execution result of the previous instruction is needed. However, if the execution result of the previous instruction is not obtained at that point (for example, the execution result of a division instruction that requires many cycles is not obtained), the pipeline must be stalled until the execution result of the previous instruction is obtained. On the contrary, if the value prediction feature is provided, the pipeline can be prevented from being stalled by predicting the execution result of the previous instruction if the predicted execution result is correct.

One method of realizing a branch/value prediction is to store an execution result of an instruction in a history table when the instruction is executed, and make predictions from the execution result of the past instruction by referring to the history table when the execution result of the instruction is predicted. A program counter is used as a subscript of a prediction table.

When the branch/value prediction was done, an instruction execution unit of the processor obtains a correct execution result of the instruction under which the execution result was predicted. The correct execution result and a predicted value are compared. If the predicted value is correct, the execution result of the instruction executed using the predicted value is validated. If the predicted value is incorrect, the instruction executed using the predicted value is canceled and re-executed.

The lesser the cancellation of the instruction executed using the predicted value is, the higher the processor performance is obtained. Accordingly, a high percentage of correct predictions is obtained for the branch/value prediction.

In the branch/prediction device, one method to predict more acculate the high percentage of correct predictions is to use branch prediction algorithm having multiple different properties and a device that selects the output of the branch prediction algorithm, as described in "Combining Branch Predictions", by Scott McFarling, WRL Technical Notes TN-36, Digital Equipment Western Research Laboratory, June 1993.

The branch prediction feature differs in the usual behavior of a branch instruction depending on the branch prediction algorithm. Therefore, a higher percentage of correct predictions than in the case where only one branch prediction algorithm is used can be obtained by predicting that the prediction of which branch prediction algorithm is correct using the branch prediction feature having two branch prediction algorithms or more of two different properties and a table that stores the latest correct/incorrect predictions of each of the branch prediction algorithms.

However, this method has a disadvantage in which the number of circuits increases because two prediction algorithms or more and a circuit that selects the prediction algorithms must be mounted. In the branch prediction circuit, one method of obtaining the high percentage of correct predictions is to invalidate a branching entry of low probability as described in Japanese Unexamined Patent Publication No. Hei 08-110857. By invalidating the entry in history table, the invalidated branch instruction is judged not to branch. Therefore, the decrease of the percentage of correct predictions caused by invalidating the branching entry of the low probability is slight, whereas it is assumed that the probability of erasing the branching entry of high probability when the execution result of the branch instruction is newly registered in the history table is reduced and the percentage of correct predictions is increased.

However, because this method erases the entry in which a fixed standard is satisfied, the entry might have been invalidated excessively. Otherwise, the percentage of correct predictions cannot be increased in some case because there are too few entries to register a new entry into the history table.

In the branch/value prediction, one method of increasing the percentage of correct predictions is to increase an entry in which an execution result of an instruction can be stored. There are two entries or more in which the execution result of the instruction can be stored, and the configuration system that stores the execution result in any one of the entries is generally called set associative. The set associative is a system used frequently in a cache memory. In the set associate, usually, when the number of selectable entries is k, the total number of entries, or associativity is n, and the subscript of the table that stores an execution result is i, the entry to be stored is either (i mod n)–(i mod k) or (i mod n)–(i mod k)+(k−1).

In the set associative—cache memory, the set associative assumed to have the best performance is called Least-Recently-Used (LRU) among the methods of selecting an entry to be stored from two storable entries or more. According to the LRU method, a new data is stored in the entry that is not used for the longest time in the selectable entries.

To realize this, the LRU uses an LRU table of n/k entries when the total number of entries is n and the number of selectable entries is k. The LRU table records the order when the entry was referred to in the relative priority between selectable entries. The relative priority between the selectable entries is called a priority here.

For example, when the total number of entries is 16 and the number of selectable entries is 4, the eighth to 15th entries are assumed to have been referred to in the order of 8→9→10→11. At this point, the LRU table records that the entries were referred to in the order of 8→9→10→11. Subsequently, if 9 is assumed to have been referred to, the LRU table records that the entries were referred to in the order 8→10→11→9. Further, when there is an execution result to be newly stored and the execution result must be stored in any of the eighth to 11th entries, the execution result is stored in the lowest entry of the priority in the selectable entries, that is, the eighth entry that is not referred to for the longest time.

Because the problem of the LRU in the branch/value prediction is that even if the probability at which a prediction is unsuccessful is high, an entry of a high reference frequency becomes high in the priority and is left in the history table, the entry in which prediction was correct will be erased from the history table. To increase the percentage of correct predictions, the entry in which the prediction was done should exist in the prediction table rather than in the entry in which the probability at which the prediction is unsuccessful is high even if the reference frequency is low.

That is, in the LRU, because of an entry in which the reference frequency is high, but the probability at which the prediction is unsuccessful is also high, the processor performance decreases.

Accordingly, an object of the present invention is to increase the percentage of correct predictions of the branch/value prediction feature constructed using the set associative.

BRIEF SUMMARY OF THE INVENTION

To attain the above object, the present invention uses a priority table that records a priority between selectable entries in the same manner as an LRU table. The LRU table is updated so that the priority of an entry that was referred to every reference, whereas the priority table is referred to for a prediction. Only when the prediction was correct, the priority table is updated so that the priority of the entry that was referred to can be increased.

Accordingly, in a branch/value prediction feature, priorities of an entry of a low reference frequency and an entry of a low percentage of correct predictions are lowered. When there is an execution result to be newly stored, it is stored in the entry of the lowest priority among the selectable entries.

At this point, because an entry of a small contribution to a performance gain is erased from a history table and an entry of a large contribution to the performance gain is relatively left in the history table, the performance of a processor can be improved.

Further, the present invention refers to the history table in the branch/value prediction feature and decreases the priority of the entry that was referred to when the prediction is unsuccessful. Accordingly, because the entry of the small contribution to the performance gain is erased from the history table and the entry of the large contribution to the performance gain is relatively left, the performance of the processor can be improved.

Further, the present invention is referred to in the branch/value prediction feature and increases the priority of the entry that was referred to when the prediction was correct, then decreases the priority of the entry that was referred to when the prediction is unsuccessful. Accordingly, because the entry of the small contribution to the performance gain is erased from the history table and the entry of the large contribution to the performance gain is relatively left, the performance of the processor can be improved.

Further, the present invention increases a priority in accordance with the number of cycles that decreases when the prediction was correct in comparison with when the prediction was not done in the branch/value prediction feature. Consequently, the entry of the large contribution to the performance gain becomes easy to leave and the performance of the processor can be improved.

BRIEF DESCRIPTION OF SEVERAL VIEWS OF DRAWINGS

Preferred embodiments of the present invention will be described in detail on the followings, wherein.

DETAILED DESCRIPTION OF THE INVENTION

Figure 1:
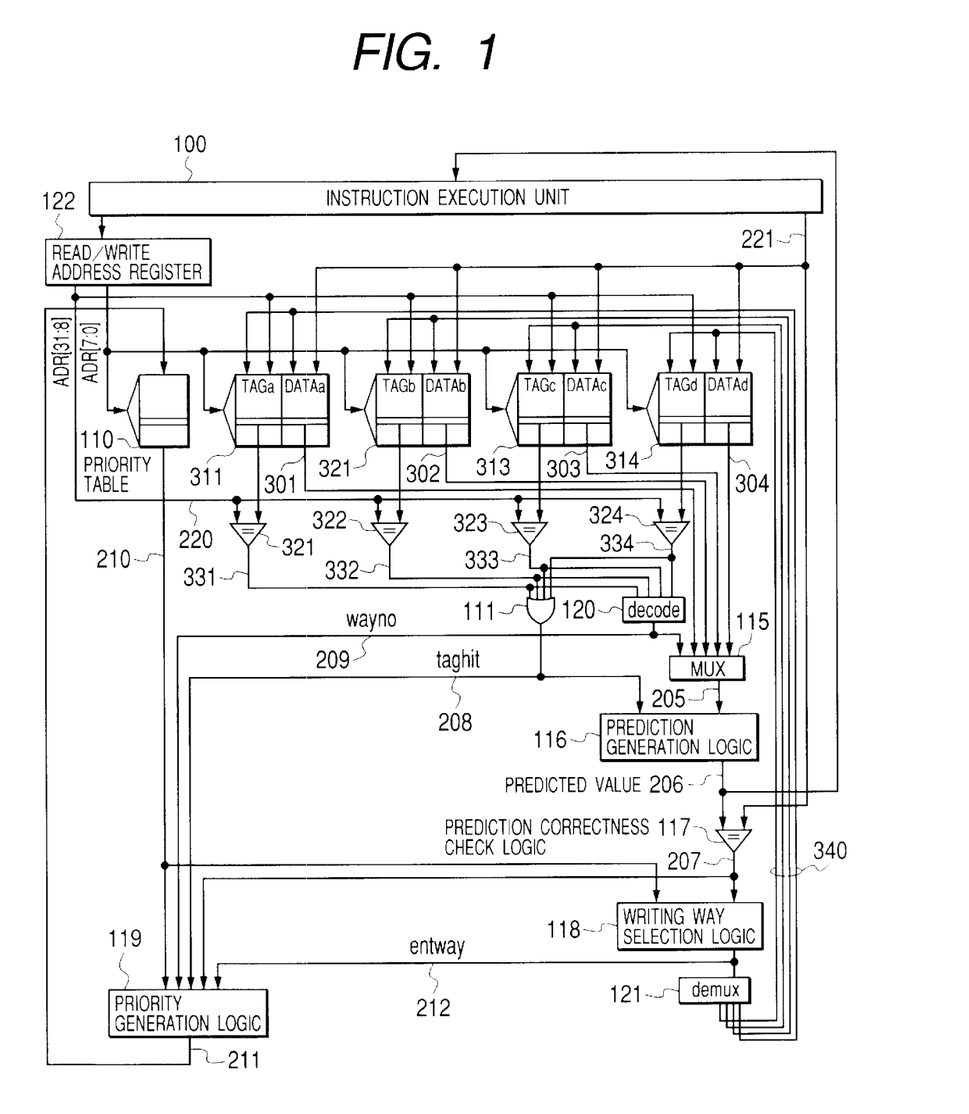
FIG. 1 is a block diagram showing an embodiment of the present invention.

FIG. 1 is a block diagram of a branch/value prediction circuit showing first to third embodiments according to the present invention. For the sake of convenience of a description, FIG. 1 is an embodiment in the configuration in which a 4-way set associative, a history table having 256 entries (1,024 entries in total) per way, a read/write address register (ADR) having 32 bits (ADR[31:0]), and eight bits (ADR[7:0]) from the LSB of the read/write address register for the reference of the history table, and satisfactorily shows the principles and operation of the present invention.

The embodiment of the present invention has an instruction execution unit 100, a priority table 110, execution result history tables a to d 311 to 314, tag matching detection circuits a to d 321 to 324, an execution result selection circuit 115, a prediction generation logic circuit 116, a prediction correctness check logic circuit 117, a writing way selection logic circuit 118, a priority generation logic circuit 119, and a read/write address register 122.

Because the embodiment of FIG. 1 uses a 4-way set associative, the priority is represented in six bits of prio[5:0]. Way numbers (0 to 3) in which data of the first highest priority is stored are represented as prio[1:0], the way numbers (0 to 3) in which data of the second highest priority is stored are represented as prio[3:2], and the way numbers (0 to 3) in which data of the third highest priority is stored are represented as prio[5:4]. The way numbers (0 to 3) in which data with the lowest priority is stored can be obtained using prio[1:0] xor prio[3:2] xor prio[5:4]. For example, when the eighth to 15th entries correspond to way0 to way3 respectively and are referred to in the order of 8→10→11→9, the priority is evaluated to be high in the order of 9→11→10→8 for an LRU and each bit of prio indicating a priority is set to prio[1:0]=1, prio[3:2]=3, and prio[5:4]=2.

The general operation is described below. First, the instruction execution unit 100 stores an address of an instruction of which the execution result is to be predicted in the read/write address register 122.

Tag information and an execution result of the past instruction are read from the history tables a to d 311 to 314 respectively. The tag matching detection circuit a 321 compares a tag (TAGa[31:8]) read from the history table a with the high-order 24 bits (ADR[31:8]) that are not used for the reference of the history table among history read/write addresses. If both match, a history a selection bit 331 is set to 1, and if both do not match, the history a selection bit 331 is set to 0. Similarly, the tag matching detection circuits b to d 322 to 324 also perform comparison and output the histories b to d selection bits 332 to 334.

A tag hit detection circuit 111 outputs 1 to a tag hit signal 208 if any of the histories a to d selection bits 321 to 324 is 1 and outputs 0 if all of them is 0.

A tag hit decoder 120 outputs the way numbers (0 to 3) in which the history selection bit is 1 using the histories a to d selection bits 321 to 324 that are output with a 1-outof-4 code as input.

An execution history selection circuit outputs any of execution results a to d 301 to 304 of the past instruction output from the history table in accordance with the way number the tag hit decoder 120 outputs, to an execution result 205 of the past instruction.

The prediction generation logic circuit 116 generates a predicted value 206 of the execution result using the execution result 205 of the past instruction as input.

The instruction execution unit 100 executes an instruction using the predicted value 206 of the execution result. The instruction execution unit 100 outputs an execution result 221 of an instruction under which the prediction was done. The prediction correctness check logic-circuit 117 compares the predicted value 206 of the execution result and the execution result 221 of the instruction. 1 is output to a correct prediction signal 207 if both match and 0 is output to it if both do not match.

The priority generation logic circuit 119 and the writing way selection logic circuit 118 perform any of the following four operations.

(1a) When any of the tags read from the history tables a to d referring to the history table and high-order 24 bits 220 of the read address match and a predicted value generated from an execution history and an execution result of an instruction match (when the correct prediction signal 207 is 1), the priority of the entry used for the prediction in the history table is increased. The contents of the history table are updated based on a prediction algorithm.

(1b) When any of the tags read from the history tables a to d referring to the history table and the high-order 24 bits 220 of the read address matched, but the predicted value generated from the execution history and the execution result of the instruction did not match (when the correct prediction signal 207 is 0), the priority of the entry used for the prediction of the history table is not changed. The contents of the history table are updated based on the prediction algorithm.

(1c) When the history table was referred to, but the high-order 24 bits 220 of the read address do not match any of the tags read from the history tables a to d, and the prediction value and the execution result of the instruction matched (when the correct prediction signal 207 is 1), nothing is done because registration into the history table is unnecessary.

(1d) When the history table was referred to, but the high-order 24 bits 220 of the read address do not match any of the tags read from the history tables a to d, and the prediction value and the execution result of the instruction did not match (when the correct prediction signal 207 is 0), the execution result the execution unit outputs is stored in the history table based on the prediction algorithm. This operation is called new registration later.

In the case of new registration, the prediction correctness check logic circuit checks whether a valid bit of the storable entry of the history tables a to d 311 to 314 is "invalid". If there is an entry in which the valid bit is "invalid", a history table write control signal 340 is set so that writing can be done to the entry.

If there is no entry in which the valid bid is "invalid", a priority is read from the priority table 110 using an address that was used when a history table was referred to and the history table write control signal 340 is set so that writing can be done to the history table side of the entry of the lowest priority.

Figure 2:
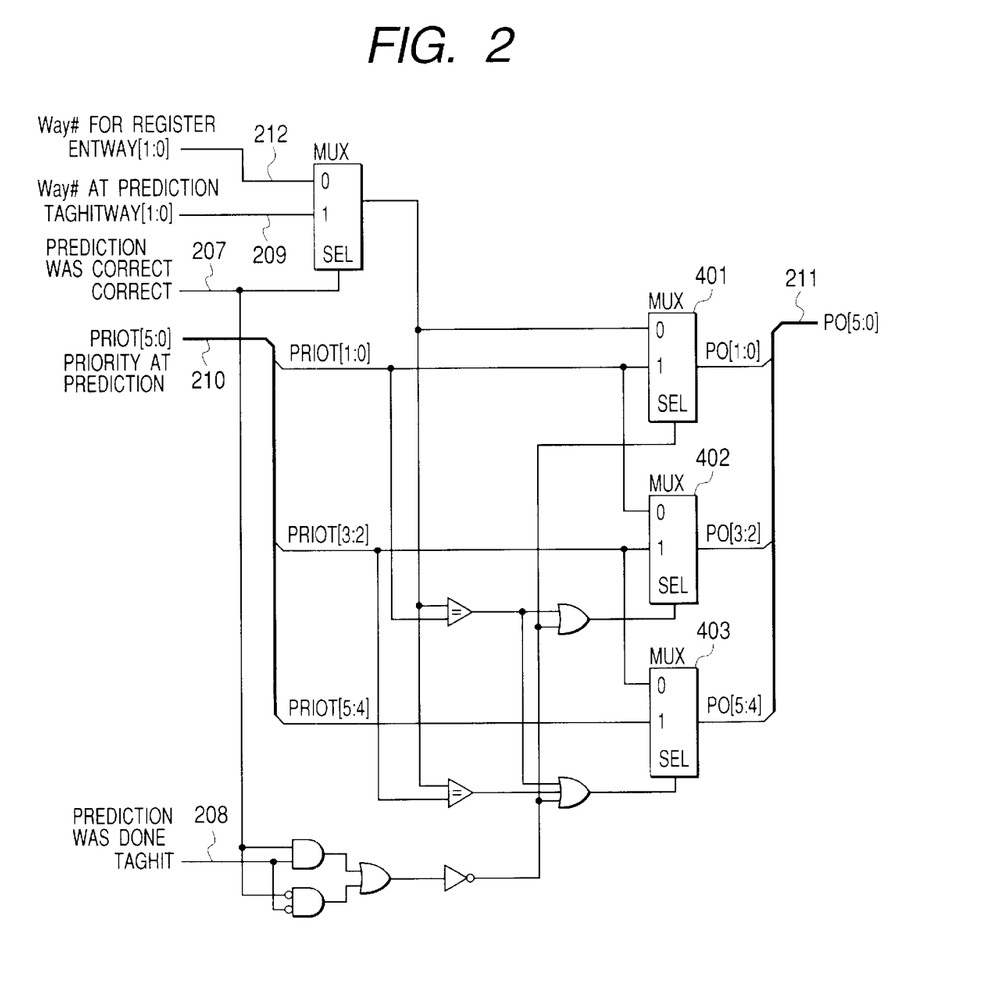
FIG. 2 is a first embodiment of a priority generation logic circuit of a 4-way set associative.

FIG. 2 shows a first embodiment of a priority generation logic circuit when the way number is 4. The priority generation logic circuit uses a way number 212 at new registration, a priority 210 read from a priority table, the correct prediction signal 207, a tag hit signal 208, and a way 209 referred to for a prediction as input and outputs a priority 266 that should be recorded in the priority table 110.

In the case of (1a), the correct prediction signal 207 is set to 1 and tag hit signal 208 is set to 1. At this point, because the way referred to for a prediction is registered in a priority table as the way of the highest priority, the way 209 referred to for the prediction is output to P0[1:0] of the priority 266 that should be recorded in the priority table 110. In conformity with this, if the priority of a way other than the way referred to for a prediction is higher than the priority when the way is referred to for the prediction, the priority is decreased one stage.

In the case of (1b), the correct prediction signal 207 is set to 0 and the tag hit signal 208 is set to 1. At this point, selection signals of multiplexers 401 to 404 are set to 1 and the priority is not changed.

In the case of (1c), the correct-prediction signal 207 is set to 1 and the tag hit signal 208 is set to 0. At this point, the selection signals of the multiplexers 401 to 404 are set to 1 and the priority is not changed.

In the case of (1d), the correct prediction signal 207 is set to 0 and the tag hit signal 208 is set to 0. At this point, because the way the prediction correctness check logic circuit is registered in the priority table as the way of a high priority, the way 212 that is newly registered is output to P0[1:0] of the priority 266 that should be recorded in the priority table 110. In conformity with this, if the priority of a way other than the way referred to for a prediction is higher than the priority when the way is referred to for the prediction, the priority is decreased one stage.

Figure 3:
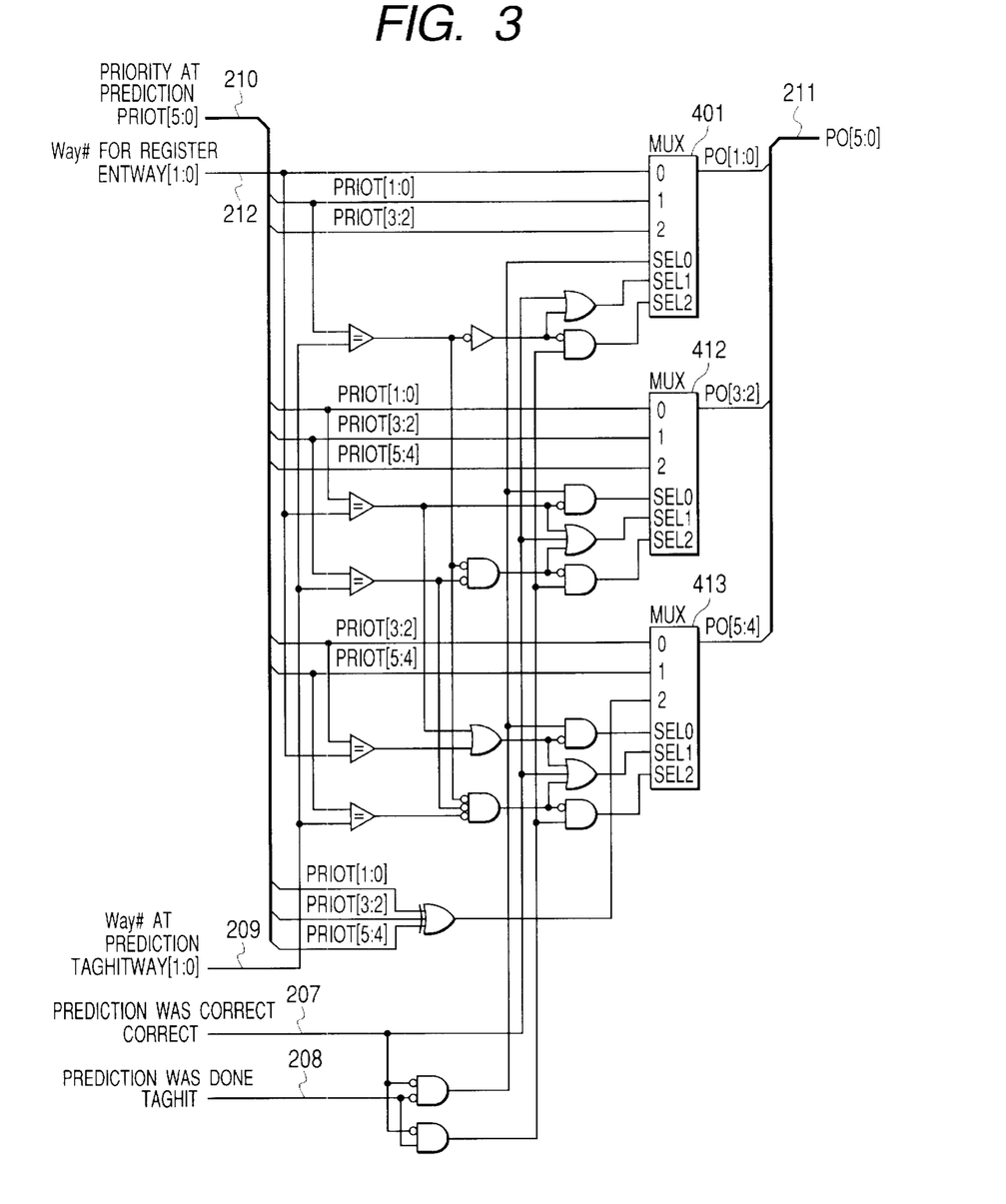
FIG. 3 is a second embodiment of the priority generation logic circuit of the 4-way set associative.

When the operation is done as described above, in the branch/value prediction feature, the priority of an entry of a high reference frequency and a high percentage of correct predictions is increased. That is, the priority of the entry of a large contribution to a performance gain is increased. Accordingly, because the entry of a small contribution to the performance gain is erased from a history table and the entry of a large contribution to the performance gain is relatively left in the history table, the percentage of correct predictions can be increased. FIG. 3 shows a second embodiment of the priority generation logic circuit when the way number is 4. This circuit performs any of the following operations.

(2a) When any of the tags read from the history tables a to d referring to the history table and the high-order 24 bits 220 of the read address match and a predicted value generated from an execution history and an execution result of an instruction matched (when the prediction signal 207 is 1), the priority of the entry used for the prediction of the history table is not changed. The contents of the history table are updated based on prediction algorithm.

(2b) When any of the tags read from the history tables a to d referring to the history table and the high-order 24 bits 220 of the read address matched, but the predicted value generated from the execution history and the execution result of the instruction did not match (when the prediction signal 207 is 0), the priority of the entry used for the prediction of the history table is decreased. The contents of the history table are updated based on the prediction algorithm.

(2c) When the history table was referred to, but the high-order 24 bits 220 of the read address do not match any of the tags read from the history tables a to d, and the prediction value and the execution result of the instruction matched (when the correct prediction signal 207 is 1), nothing is done because registration into the history table is unnecessary.

(2d) When the history table was referred to, but the high-order 24 bits 220 of the read address do not match any of the tags read from the history tables a to d, and the prediction value and the execution result of the instruction did not match (when the correct prediction signal 207 is 0), the execution result the execution unit outputs is stored in the history table based on the prediction algorithm. (New registration)

Figure 4:
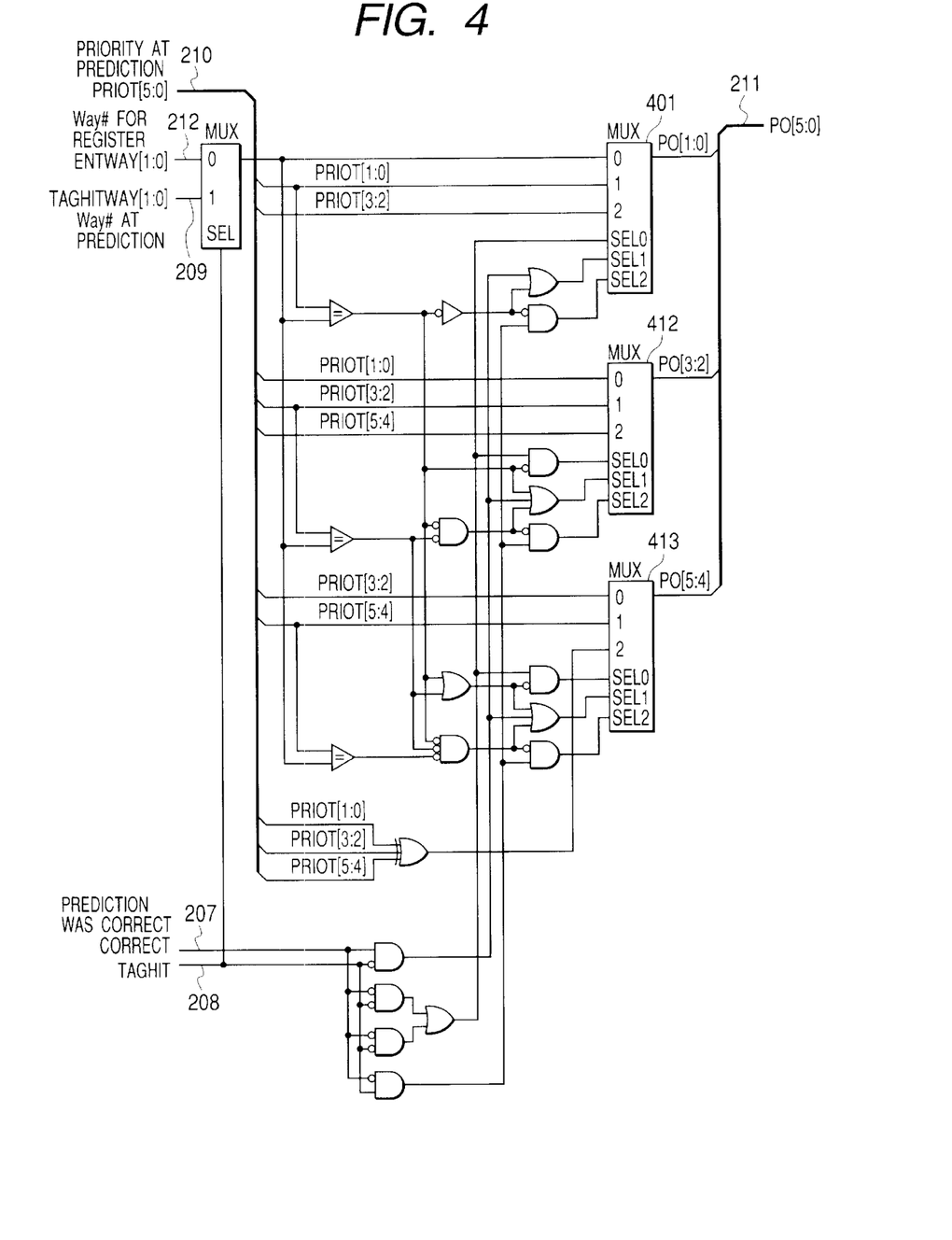
FIG. 4 is a third embodiment of the priority generation logic circuit of the 4-way set associative.

When the operation is done as described above, in the branch/value prediction feature, the priority of an entry of a high reference frequency and a low percentage of correct predictions is increased. That is, the priority of the entry of a large contribution to a performance gain is decreased. Accordingly, because the entry of a small contribution to the performance gain is erased from a history table and the entry of a large contribution to the performance gain is relatively left in the history table, the percentage of correct predictions can be increased. FIG. 4 shows a third embodiment of the priority generation logic circuit when the way number is 4. This circuit performs any of the following operations.

(3a) When any of the tags read from the history tables a to d referring to the history table and the high-order 24 bits 220 of the read address match and a predicted value generated from an execution history and an execution result of an instruction matched (when the prediction signal 207 is 1), the priority of the entry used for the prediction of the history table is increased. The contents of the history table are updated based on prediction algorithm.

(3b) When any of the tags read from the history tables a to d referring to the history table and the high-order 24 bits 220 of the read address matched, but the predicted value generated from the execution history and the execution result of the instruction did not match (when the prediction signal 207 is 0), the priority of the entry used for the prediction of the history table is decreased. The contents of the history table are updated based on the prediction algorithm.

(3c) When the history table was referred to, but the high-order 24 bits 220 of the read address do not match any of the tags read from the history tables a to d, and the prediction value and the execution result of the instruction matched (when the correct prediction signal 207 is 1), nothing is done because registration into the history table is unnecessary.

(3d) When the history table was referred to, but the high-order 24 bits 220 of the read address do not match any of the tags read from the history tables a to d, and the prediction value and the execution result of the instruction did not match (when the correct prediction signal 207 is 0), the execution result the execution unit outputs is stored in the history table based on the prediction algorithm. (New registration)

When the operation is done as described above, in the branch/value prediction feature, the priority of an entry of a high reference frequency and a high percentage of correct predictions is increased. Further, the priority of the entry of the high reference frequency and the low percentage of correct predictions is decreased. That is, the priority of the entry of a small contribution to a performance gain is decreased. Accordingly, because the entry of the small contribution to the performance gain is erased from a history table and the entry of a large contribution to the performance gain is relatively left in the history table, the percentage of correct predictions can be increased.

Figure 5:
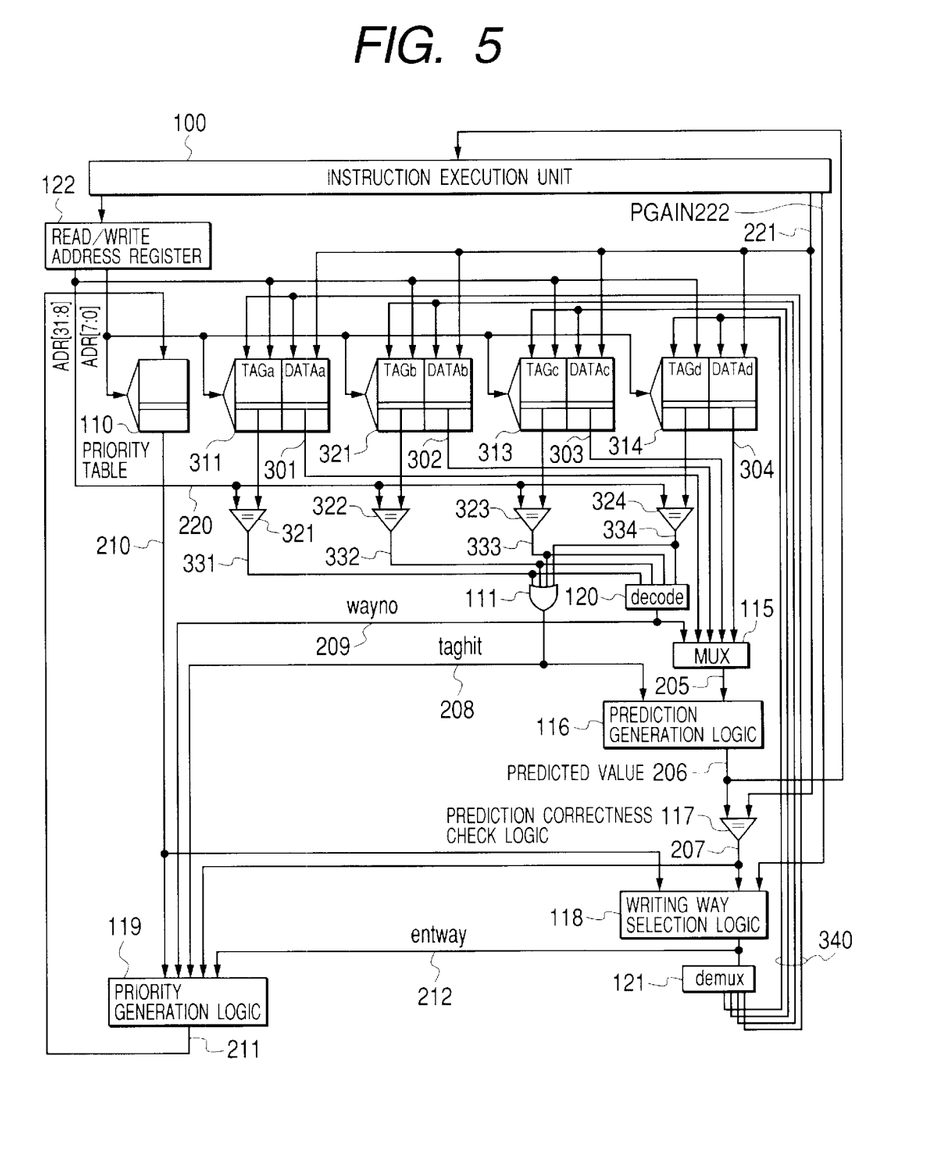
FIG. 5 is a block diagram showing a fourth embodiment of the present invention.
Figure 6:
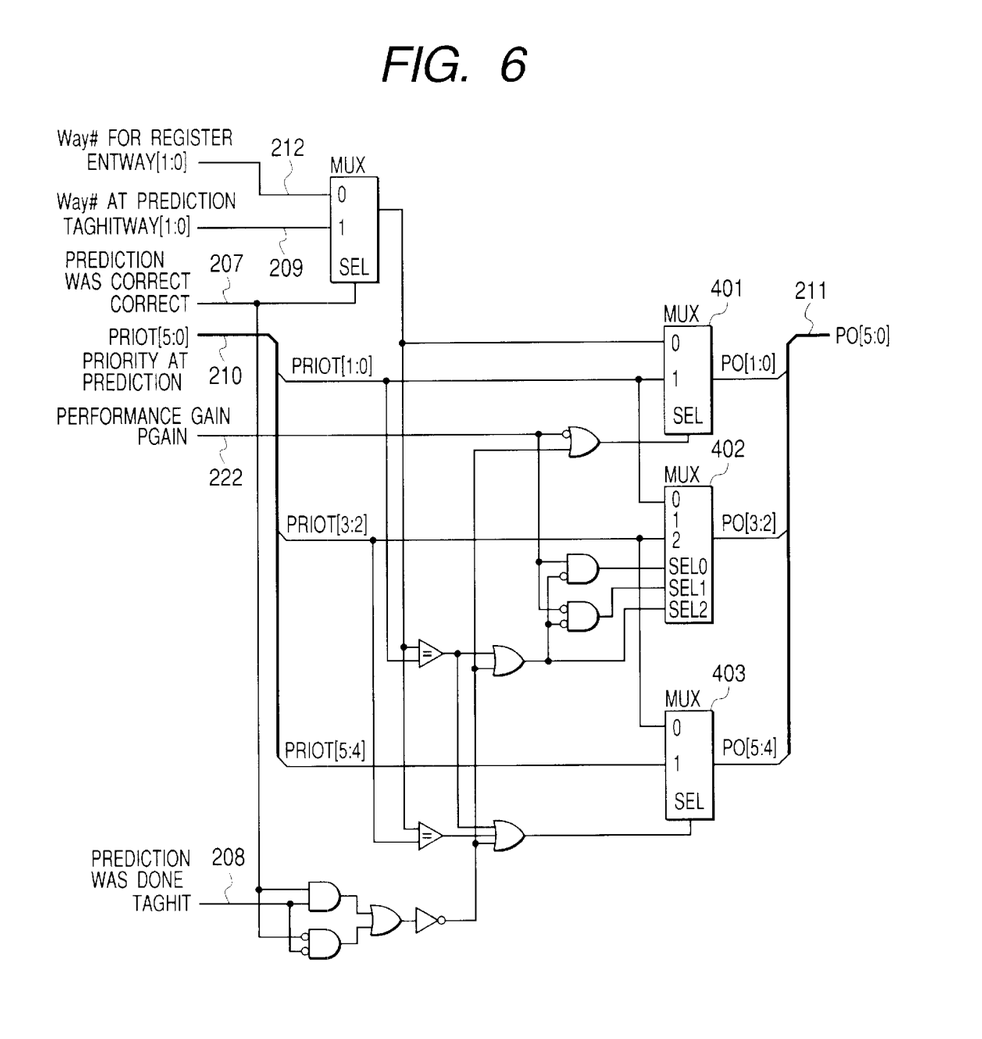
FIG. 6 is a fourth embodiment of the priority generation logic circuit of the 4-way set associative.

FIG. 6 shows a fourth embodiment of the priority generation logic circuit when the way number is 4. FIG. 5 shows a block diagram of the branch/value prediction circuit in the fourth embodiment.

This priority generation logic circuit performs any one of the following four operations.

(4a) When any of the tags read from the history tables a to d referring to the history table and the high-order 24 bits 220 of the read address match and a predicted value generated from an execution history and an execution result of an instruction matched (when the prediction signal 207 is 1), the priority of the entry used for the prediction of the history table is increased. The contents of the history table are updated based on prediction algorithm. At this point, If the number of cycles that decreases when the prediction the execution unit 100 outputs was done is high, a signal 222 is set to 1. If the number of cycles that decreases when the prediction the execution unit 100 outputs was done is low, the signal 222 is set to 0. The priority generation logic circuit maximizes the priority of an entry used for the prediction of the history table if the number of cycles that decreases when the prediction was done is high (when the signal 222 is 1). To the contrary, the priority generation logic circuit increases the priority of an entry used for the prediction of the history table in the second place when the number of cycles that decreases when the prediction was done is low (when the signal 222 is 0). However, when the priority of the entry used for the prediction is first from the beginning, the priority is not changed. The contents of the history table are updated based on the prediction algorithm.

(4b) When any of the tags read from the history tables a to d referring to the history table and the high-order 24 bits 220 of the read address matched, but the predicted value generated from the execution history and the execution result of the instruction did not match (when the prediction signal 207 is 0) the priority is not changed. The contents of the history table are updated based on the prediction algorithm.

(4c) When the history table was referred to, but the high-order 24 bits 220 of the read address do not match any of the tags read from the history tables a to d, and the prediction value and the execution result of the instruction matched (when the correct prediction signal 207 is 1), nothing is done because registration into the history table is unnecessary.

(4d) When the history table was referred to, but the high-order 24 bits 220 of the read address do not match any of the tags read from the history tables a to d, and the prediction value and the execution result of the instruction did not match (when the correct prediction signal 207 is 0), the execution result the execution unit outputs is stored in the history table based on the prediction algorithm. (New registration)

When the operation is done as described above, in the branch/value prediction feature, the priority of an entry of a high reference frequency and a high percentage of correct predictions is increased as the number of cycles that decreases when the prediction was done becomes high. Thus, the larger a contribution to a performance gain is, the easier to stay the entry is. The smaller a contribution to a performance gain, the easier to erase the entry is. Accordingly, the performance of the processor can be increased.

Because the present invention is constituted as described above, the following effects of increasing the percentage of correct predictions of the branch/value prediction feature are obtained as described below.

First, the first effect can improve a prediction hitting ratio by (a) increasing the priority of an entry that is referred to for a prediction and used for the prediction only when the prediction is correct and (b) registering an execution result of an instruction in the entry of the lowest priority when it is newly registered in a history table.

The second effect can improve the prediction hitting ratio by (a) increasing the priority of an entry that is referred to for a prediction and used for the prediction only when the prediction is unsuccessful and (b) registering the execution result of the instruction in the entry of the lowest priority when it is newly registered in the history table.

The third effect can improve the prediction hitting ratio by (a) increasing the priority of an entry that is referred to at new registration and for a prediction and used for the prediction only when the prediction is unsuccessful and (b) registering the execution result of the instruction in the entry of the lowest priority when it is newly registered in the history table.

The fourth effect can improve the performance of the processor by (a) increasing the priority of an entry that is referred to at new registration and for a prediction and used for the prediction as the number of cycles that decreases when the prediction is correct and the prediction was correct becomes high and (b) registering the execution result of the instruction in the entry of the lowest priority when it is newly registered in the history table.

What is claimed is:

1. A processor having an execution result prediction function for an instruction that includes one or a plurality of instruction execution units for executing the instruction and a predicting means for generating a predicted value of an execution result of an instruction that is being executed currently from the execution result of the instruction executed in the past, wherein the instruction execution unit executes the instruction using the predicted value of the execution result of the instruction the predicting means outputs, and the predicting means, including:

an execution result history table that selects the execution result of the instruction executed in the past from two writing ways or more and stores it as an entry;

a priority table that stores a priority between the entries stored in the history table;

a prediction generation logic means for predicting the execution result of the instruction that is being executed currently from the entry read from the history table;

a prediction correctness check logic means that decides whether the predicted value was correct or not as a result of having actually executed the instruction under which the execution result was predicted; and a writing way selection logic means that selects a writing way stored in the history table and a priority generation logic means that generates the priority written in the priority table, wherein the prediction generation logic means allows the predicting means to generate the predicted value of the execution result of the instruction that is executing currently from the entry of the history table, when the prediction generation logic means indicates that the generated predicted value and the execution result of the instruction that is being executed currently are identical, the priority generation logic means increases the priority of the priority table so that it will be indicated that the entry of the history table used as the input of the prediction generation logic means is useful, and when the prediction generation logic means indicates that the predicted value and the execution result of the instruction that is being executed currently differ, the priority of the priority table is not changed.

2. A processor having an execution result prediction function for an instruction that includes one or a plurality of instruction execution units for executing an instruction and a predicting means that generates a predicted value of an execution result of the instruction that is being executed currently from the execution result of the instruction executed in the past, wherein the instruction execution unit executes the instruction using the predicted value of the execution result of the instruction the predicting means outputs, and the predicting means, including:

an execution result history table that selects the execution result of the instruction executed in the past from two writing ways or more and stores it as an entry;

a priority table that stores a priority between the entries stored in the history table;

a prediction generation logic means for predicting the execution result of the instruction that is being executed currently from the entry read from the history table;

a prediction correctness check logic means that decides whether the predicted value was correct or not as a result of having actually executed the instruction under which the execution result was predicted; and a writing way selection logic means that selects a writing way stored in the history table and a priority generation logic means that generates the priority written in the priority table, and the prediction generation logic means generates a predicted value of the execution result of the instruction the predicting means is executing currently from the entry of the history table, when the prediction generation logic means indicates that the generated predicted value and the execution result of the instruction that is being executed currently are different, the priority generation logic means decreases the priority of the priority table so that it will be indicated that the entry of the history table used as the input of the prediction generation logic means is not useful, and when the prediction generation logic means indicates that the predicted value and the execution result of the instruction that is being executed currently are identical, the priority of the priority table is not changed.

3. A processor having an execution result prediction function for an instruction that includes one or a plurality of instruction execution units for executing the instruction and a predicting means that generates a predicted value of an execution result of the instruction that is being executed currently from the execution result of the instruction executed in the past, wherein the instruction execution unit executes the instruction using the predicted value of the execution result of the instruction the predicting means outputs, and the predicting means, including:

an execution result history table that selects the execution result of the instruction executed in the past from two writing ways or more and stores it as an entry;

a priority table that stores a priority between the entries stored in the history table;

a prediction generation logic means for predicting the execution result of the instruction that is being executed currently from the entry read from the history table;

a prediction correctness check logic means that decides whether the predicted value was correct or not as a result of having actually executed the instruction under which the execution result was predicted; and a writing way selection logic means that selects a writing way stored in the history table and a priority generation logic means that generates the priority written in the priority table, wherein the prediction generation logic means generates the predicted value of the execution result of the instruction the predicting means is executing currently from the entry of the history table using the contents of the history table, when the prediction generation logic means indicates that the generated predicted value and the execution result of the instruction that is being executed currently are identical, the priority generation logic means increases the priority of the priority table so that it will be indicated that the entry of the history table used as the input of the prediction generation logic means is useful, and when the prediction generation logic means indicates that the predicted value and the execution result of the instruction that is being executed currently differ, the priority generation logic means decreases the priority of the priority table so that it will be indicated that the entry of the history table used as the input of the prediction generation logic means is unnecessary.

4. The processor having the execution result prediction function for the instruction according to claim 1, further including:

a prediction result check logic means for deciding the number of cycles that decreases when a prediction is done and the prediction was correct and the number of cycles that increases when a prediction is done and the prediction was not correct in the execution of the instruction using the predicted value, wherein when the prediction result check logic means increases the priority of the priority table so that it will be indicated that the entry of the history table is useful, the higher the decreasing number of cycles shown by the prediction result check logic means is, the more the priority of the priority table is increased.

5. The processor having the execution result prediction function for the instruction according to claim 1, wherein the instruction that predicts the execution result is a branch instruction.

* * * * *